United States Patent [19]

Dahl

[11] Patent Number: 5,732,993
[45] Date of Patent: Mar. 31, 1998

[54] ASPHALT PLANT WITH COLLAPSIBLE MATERIAL BINS

[76] Inventor: Joel Millard Dahl, 220 F St., West Fargo, N. Dak. 58078

[21] Appl. No.: 560,997

[22] Filed: Nov. 21, 1995

[51] Int. Cl.[6] .................................................. B60P 3/06
[52] U.S. Cl. ........................... 296/27; 296/15; 298/8 H; 366/177.1
[58] Field of Search .................... 296/26, 27, 15, 296/181, 183; 298/8 R, 8 H, 24; 105/243, 248; 366/177.1, 349

[56] References Cited

U.S. PATENT DOCUMENTS

| | | | |
|---|---|---|---|
| 2,589,988 | 3/1952 | Bruno | 298/8 H |
| 3,088,713 | 5/1963 | Gard | 259/18 |
| 3,182,968 | 5/1965 | Geerlings | 259/9 |
| 3,413,032 | 11/1968 | Dendy | 296/15 X |
| 3,638,922 | 2/1972 | Guglietti | 259/154 |
| 3,697,052 | 10/1972 | Andris | 259/8 |
| 4,460,214 | 7/1984 | Kuhns | 296/15 X |
| 4,497,259 | 2/1985 | Titterton | 296/27 X |
| 4,793,711 | 12/1988 | Ohlson | 366/18 |
| 4,922,463 | 5/1990 | Del Zotto et al. | 366/21 |
| 4,946,214 | 8/1990 | Neumann et al. | 298/24 X |
| 5,018,868 | 5/1991 | Baillie | 366/10 |
| 5,149,192 | 9/1992 | Hamm et al. | 366/8 |

Primary Examiner—Joseph D. Pape
Attorney, Agent, or Firm—Curtis V. Harr

[57] ABSTRACT

The present invention discloses a method of constructing collapsible raw material bins for a portable asphalt plant in such a manner that said raw material bins may be located on the same flatbed semi trailer as the rest of the asphalt plant. The collapsible material bins are constructed in such that, when not in use, they may collapse in an accordion-like fashion upon one another. This is done by having one wall of two of the bins constructed so that it may slide in and out within the respective bin. Additionally, the bins themselves are mounted on a sliding rail system which allows for the necessary movement of the bin walls. The end result of this design is that it provides a compact enough raw material bin system to allow it to be constructed on the same flatbed trailer as the asphalt tumbler, and yet provides a large enough raw material bin capacity to allow for the efficient operation of the portable asphalt plant.

13 Claims, 7 Drawing Sheets

ASPHALT PLANT WITH COLLAPSIBLE MATERIAL BINS

BACKGROUND OF THE INVENTION

The present invention relates to an improvement in the design of material bins on an asphalt plant. These bins are used to hold and distribute raw materials prior to their mixing in an asphalt tumbler. More specifically, to a method of constructing the material bins of a portable asphalt plant in such a manner that allows them to collapse in an accordion like fashion when not in use. The significance of this construction technique is that it allows the entire asphalt plant to be built on one flatbed trailer, of a legal towing length. The use of a single trailer allows for easier and and less expensive transportation and set up and ultimately more efficient production.

In the past, portable asphalt plants, used predominantly in highway related construction, have been built on two or more flatbed trailers. There are a number of problems that are inherent in this type of system. First, these systems are by nature expensive in the initial purchase of the plants because the multiple flatbed semi trailers add significantly to the cost of the asphalt plant itself. Additionally, the operator must also purchase a complex conveyor system to move the raw material from one separate component of the plant to the other. These two factors add significantly, and unnecessarily, to an operator's initial capital expenditure in the purchase of a portable asphalt plant.

Another problem with the multiple flatbed design is that they are by nature inefficient in their operation. The various components of the asphalt plant are located on separate flatbed trailers, such as the raw material bins and the asphalt tumbler, the components must be connected to one another by a complex conveyor system. Not only does this add unneeded complexity to the system, and therefore problems and delays, but it also requires a great deal of time and a large area at the job site to set up and operate.

A related problem is the significant increase in labor, and therefore costs, of setting up and operating such a multiple trailer system. The operator must employ extra people to assemble, disassemble, and operate the plant at the job site. Not only does the interconnecting conveyor system require extra time and labor in set up, but the system must also be constantly monitored during operation to ensure the steady flow of the raw materials from the bins to the tumbler. Also, because the raw material bins and the asphalt tumble are separated by a significant distance at the job site, additional workers may often be employed to monitor the mixing process at the tumbler during plant operation.

There is also a very significant increase in costs to the operator in the transportation between job sites of such a system. In addition the added cost of the multiple flatbed trailers and the interconnecting conveyor system, there is also the necessity of having either make additional trips or to have an additional semi tractor for each flatbed trailer being used.

From the foregoing discussion it can be seen that it would be highly desirable to have a self contained portable asphalt plant that could be built on and operated from a single flatbed semi trailer. Further, to provide such a system that would have raw material bins with a large enough capacity to make the system efficient in its operation, yet built in such a manner that would allow them to be located on the same flatbed trailer as the asphalt tumbler.

The present invention addresses these problems by providing a portable asphalt plant that is built on, and may be operated in a efficient manner from, one semi flatbed trailer. This is accomplished through the use of large capacity raw material bins that, when not in use, collapse in an accordion like fashion upon one another. When the system is in use, the raw material bins can be extended in a rearward manner by the use of a sliding rail system, which provides the necessary internal capacity for the efficient operation of the portable asphalt plant. The present invention also offers other advantages over the prior art and solves problems associated therewith.

SUMMARY OF THE INVENTION

It is the primary objective of the present invention to provide a method of constructing a portable asphalt plant that can be built upon and operated efficiently from a single flatbed semi trailer.

This objective is accomplished through an improvement in the design and construction of the raw material bins commonly used in the industry. Prior to the present invention, the raw material bins of a portable asphalt plant have been located on a separate flatbed trailer from the asphalt tumbler. The present invention allows these bins to be located on the same flatbed trailer as the tumbler, thus increasing the efficiency of such a system and providing significant savings to the operator in both capital expenditures and labor costs.

The a fore mentioned benefits are realized by constructing the raw material bins in such a manner that, when not in use, allows them to collapse in an accordion-like fashion upon one another. This is done by having one wall of two of the three bins being constructed in such a manner that allows it to slide in and out within the respective bin. These bins may be of a variety of shapes for example the bin may be tapered completely from top to bottom or it have straight walls on top followed by a tapered section on the lower portion. Additionally, the bins themselves are constructed on a sliding rail system which allows for the necessary movement of the bin walls. The end result of this construction technique is that it provides a compact enough raw material bin system to allow it to be constructed on the same flatbed trailer as the asphalt tumbler, and yet provides a large enough raw material bin capacity to allow for the efficient operation of the portable asphalt plant.

It is further contemplated that the size of the bins may be configured so as to allow a four bin system or a three bin system.

For a better understanding of the improvements provided by the present invention, reference should be made to the drawings in which there is illustrated and described preferred embodiments of the present invention.

DESCRIPTION OF THE PREFERRED EMBODIMENT

Figure 1:
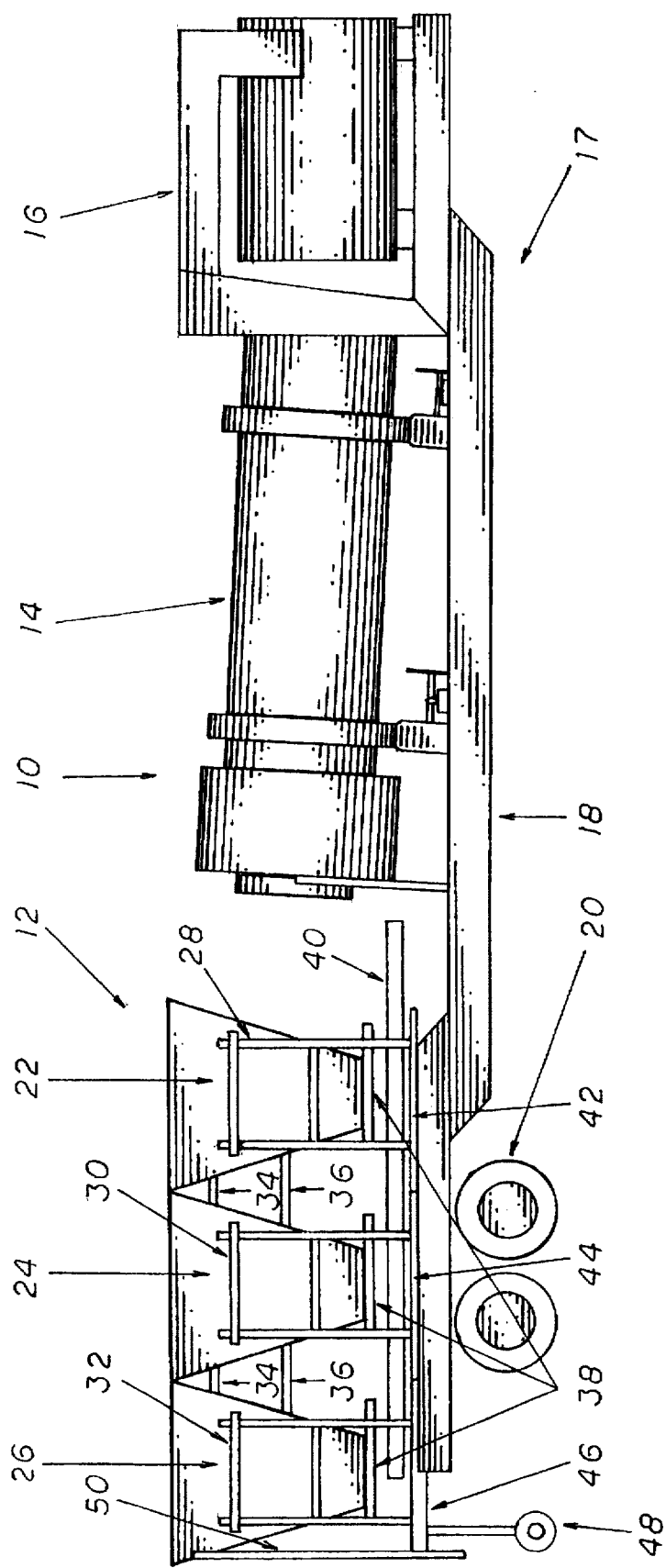
FIG. 1 is a side elevation view of the collapsible material bins and shows the orientation of its major components in relation to each other and in relation to a single trailer asphalt plant as a whole.

Referring now to the drawings, and more specifically to FIG. 1, the Single Semi Trailer Asphalt Plant 10 consists of the raw material bins 12 which are mounted on the semi trailer flatbed frame 18 just above the rear trailer wheels 20 at the most rearward end of the flatbed trailer 17. The asphalt tumbler 14 is located forward of the raw material bins 12 on the flatbed trailer 17 and is connected at its most forward end to the dust separator 16 which is in turn located at the most forward end of the flatbed trailer 17.

Figure 2:
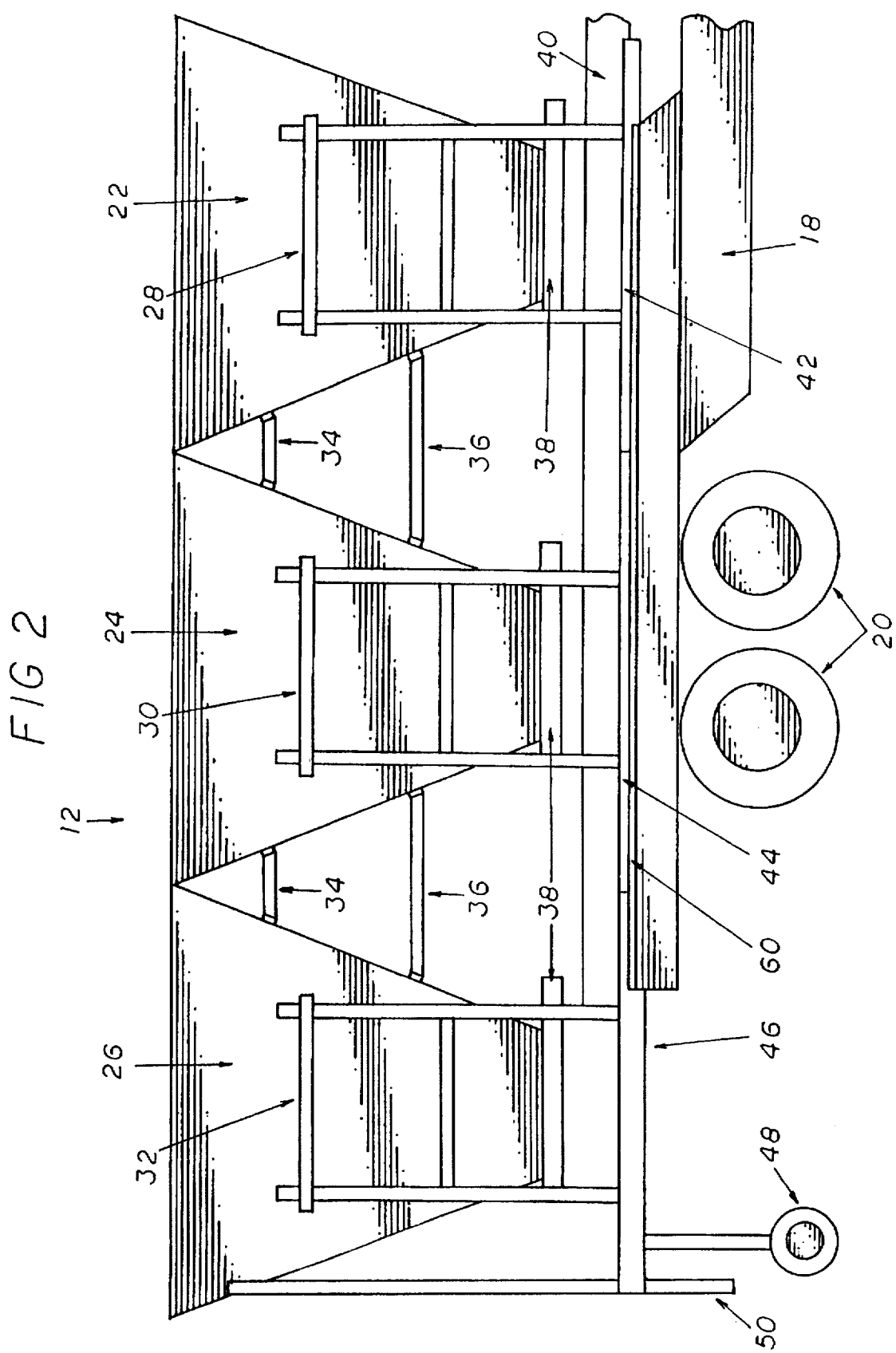
FIG. 2 is a side elevation view of the present invention showing the orientation of the major components in relation to each other when the collapsible material bins are in their extended, or in use position.

As shown by FIGS. 1 and 2, raw material used in the production asphalt are held in the raw material bins 12, and more specifically, the different types of material are held separately by the front raw material bin 22, the middle raw material bin 24, and the rear raw material bin 26. Each of these raw material bins, 22, 24, and 26, has an individual bin conveyor/regulator 38 mounted to its lower most end. The purpose of these bin conveyor/regulators 38 is to remove the respective raw materials from the raw material bins 12 in the desired ratios and to transport said raw materials to the main conveyor 40 which is located directly below the bin conveyor/regulators 38. The correct ratios of the raw material are then transported by the main conveyor 40 to the asphalt tumbler 14 where they are mixed together to produce the desired grade of asphalt.

FIGS. 1 and 2 further show the raw material bins 12 in their extended, or in use, position and also show the extension of the rear bin rail 46 beyond the most reward end of the semi flatbed trailer frame 18. It is important to note the existence of the collapsible rear bin rail support wheel 48 which is located on the lower surface of the rear bin rail 46 just forward of the collapsible bin rear support 50. The purpose of the collapsible rear bin rail support wheel 48 is to support the weight of the rear raw material bin 26 when the raw material bins 12 are in their extended, or in use, position. The rear bin rail support wheels 48 fold up along side of the rear bin rail 46 when not in use.

The front raw material bin 22, the middle raw material bin 24, and the rear raw material bin 26, are all respectively supported and held in place by the front bin support structure 28, the middle bin support structure 30, and the rear bin support structure 32. These support structures are in turn attached at their lower end to the front bin rail 42, the middle bin rail 44, and the rear bin rail 46 respectively. These bin rails fit within the bin rail guides 60 which are in turn attached to the semi flatbed trailer frame 18. This configuration allows the raw material bins 12 to be moveable and to collapse upon one another when not in use. These figures also show the positions of the upper collapsible bin wall supports 34 and the lower collapsible bin wall supports 36 located on the inner bin walls between the front raw material bin 22 and the middle raw material bin 24, and between the middle raw material bin 24 and the rear raw material bin 26.

Figure 3:
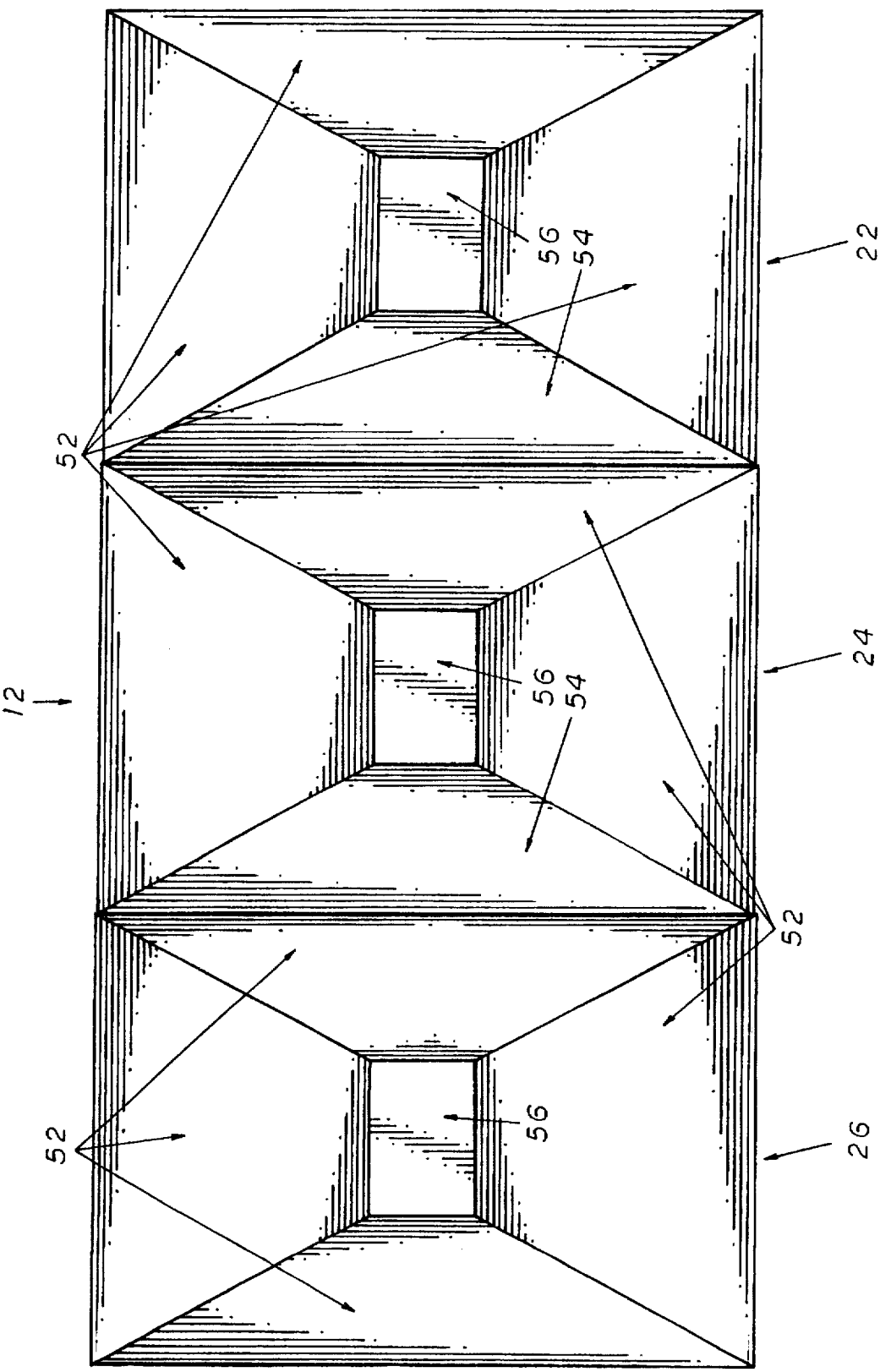
FIG. 3 is a top elevation view of the collapsible material bins showing the orientation of said bins when in the extended, or in use position.

An additional overhead view of the raw material bins 12 in their extended position is provided by FIG. 3. This figure shows the relation of the internal components of the front raw material bin 22, the middle raw material bin 24, and the rear raw material bin 26. The collapsible bin walls 54 are attached to the inside permanent bin walls 52 of the middle raw material bin 24 and to the inside bin wall 52 of the rear raw material bin 26 and extend downward to the bin floor 56 of the front raw material bin 22 and the middle raw material bin 24 respectively. This configuration allows the raw material bins 12 to hold the desired raw materials for the production of asphalt when they are in their extended, or in use position.

Figure 4:
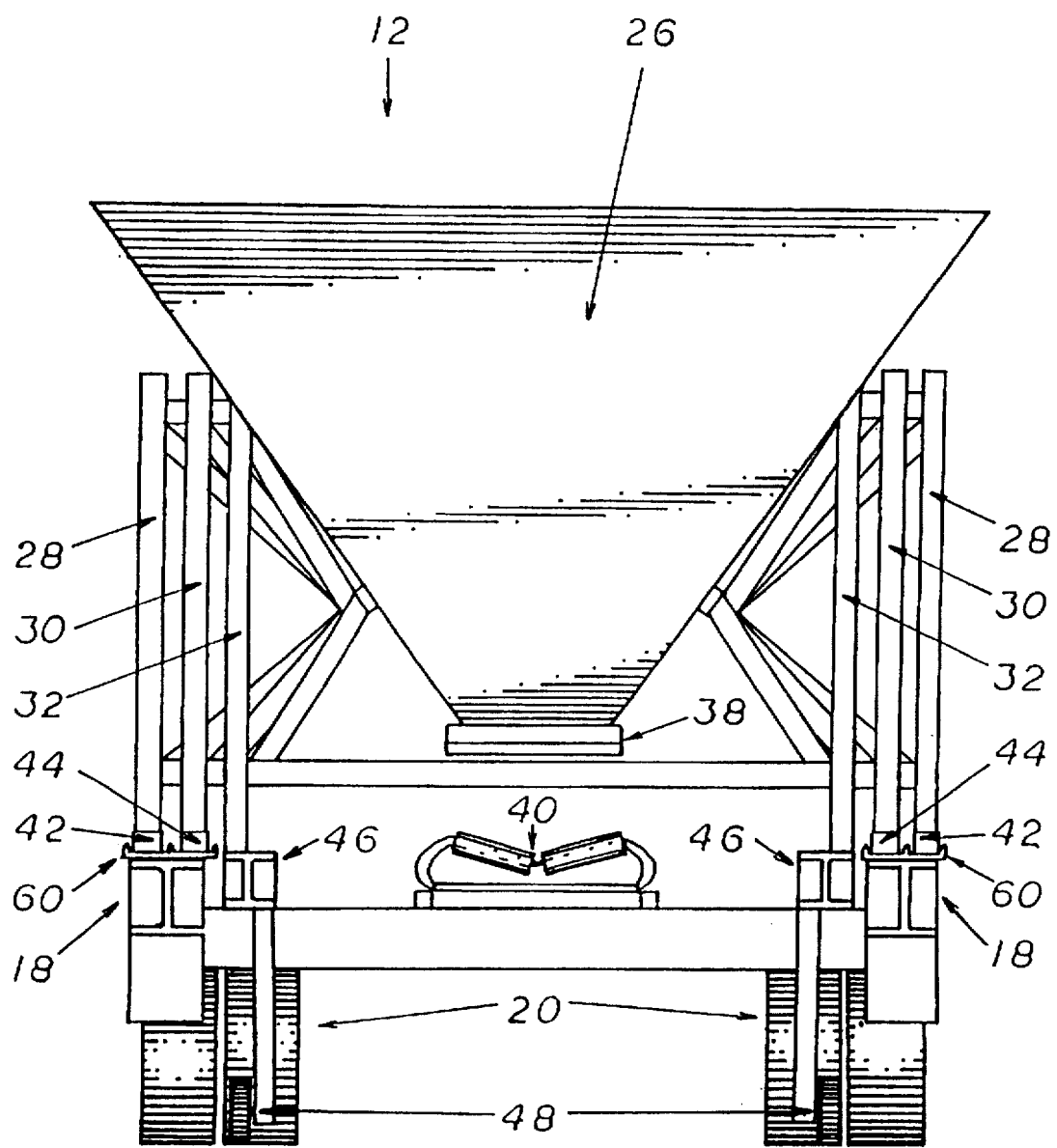
FIG. 4 is a rear elevation view showing the orientation of the support and sliding components of the present invention.

The configuration of the front, middle, and rear bin rails 42, 44, and 46 in conjunction with the front, middle, and rear bin support structures 28, 30, and 32, and their positional relationship to other major components such as the main conveyor 40, the bin conveyor/regulators 38, the rear raw material bin 26, and the trailer wheels 20, are most clearly shown by FIG. 4. (It is important to note that the collapsible bin rear support 50 has been left out of this figure for the purpose of figure clarity.)

FIG. 4 shows how the rail system is staggered inwardly from front to back, whereby, the front bin rail 42 and the front bin support structure 28 occupy the most outward position. It therefore follows that the middle bin rail 44 and the middle bin support structure 30 occupy the middle position and that the rear bin rail 46 and the rear bin support structure 32 occupy the most inward position. This allows the individual bin rails, 42, 44, and 46, the necessary ability to slide within one another when the raw material bins 12 are in their collapsed, or transport position.

This figure further shows the structural differences between the front and middle bins rails, 42 and 44, and the rear bin rail 46. The front and middle bin rails, 42 and 44, are structurally smaller than the rear bin rail 46 and are mounted in the bin rail guides 60 which are in turn mounted to the semi flatbed trailer frame 18. This is possible because the weight of the raw material bins transferred to the front and middle bin rails, 42 and 44, is supported by the semi flatbed trailer frame 18.

Conversely, when the raw material bins 12 are in their extended position, the rear bin rail 46 extends well beyond the most rearward end of the semi flatbed trailer frame 18 and must support the weight of the rear raw material bin 26 on its own. Consequently, the rear bin rails 46 are structurally larger and stronger than are the front and middle bin rails, 42 and 44, and are also mounted to the flatbed trailer frame 18 independently from them. This configuration, when used in conjunction with the collapsible rear bin rail support wheels 48, provides the necessary strength to support the weight extended over the rearward end of the flatbed trailer 18 when the raw material bins 12 are in their extended position.

Figure 5:
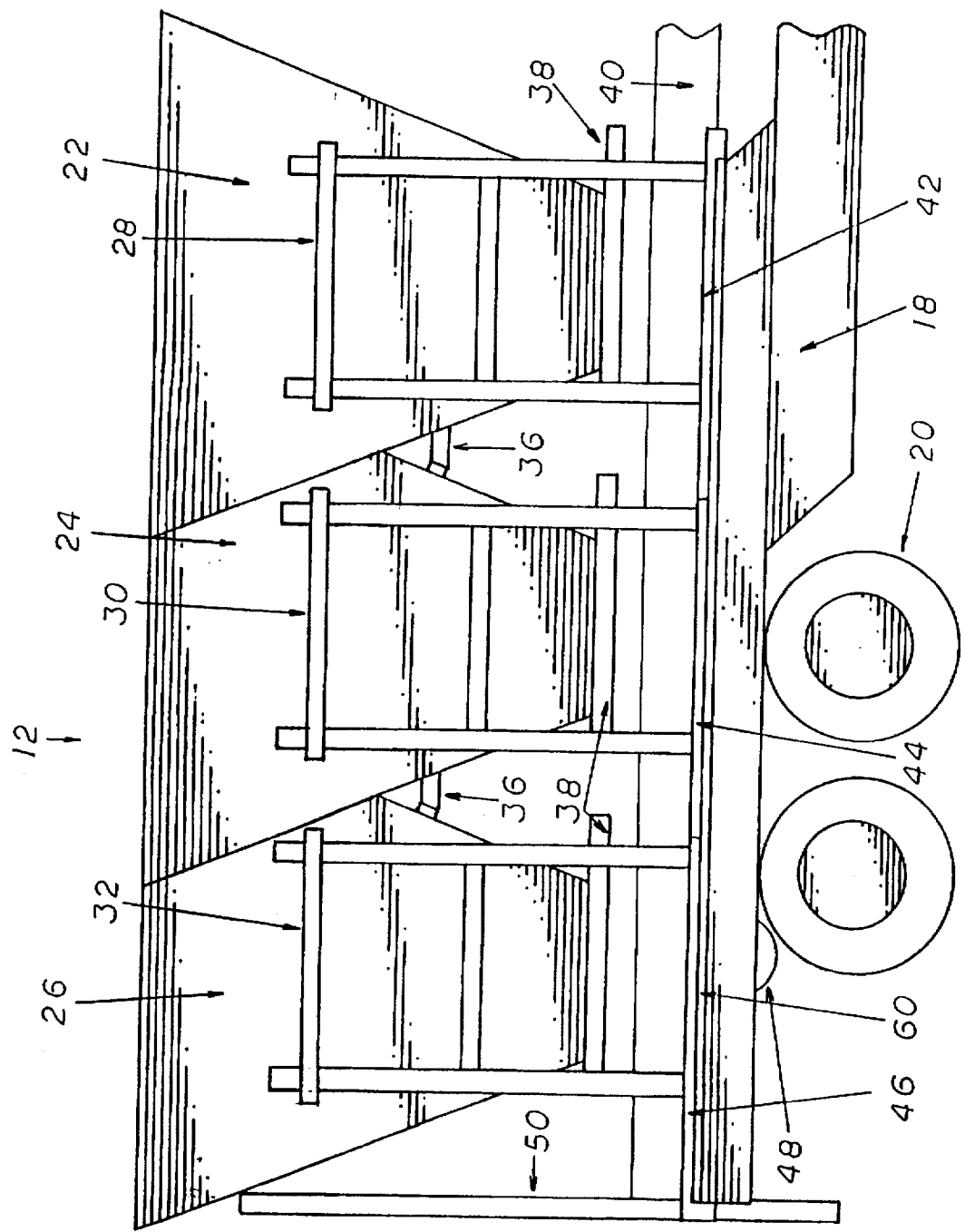
FIG. 5 is a side elevation view of the present invention showing the orientation of its major components when the material bins are in their collapsed, or transport position.

FIG. 5 shows the raw material bins in their collapsed, or transport position. When so configured, the rear raw material bin 26 fits partially inside of the middle raw material bin 24 which in turn fits partially inside of the front raw material bin 22. Thus, the rear bin rail 46 no longer extends beyond the rearward end of the flatbed trailer 18 and the collapsible rear bin rail support wheels 48 are folded up inside of the flatbed trailer frame 18.

Figure 6:
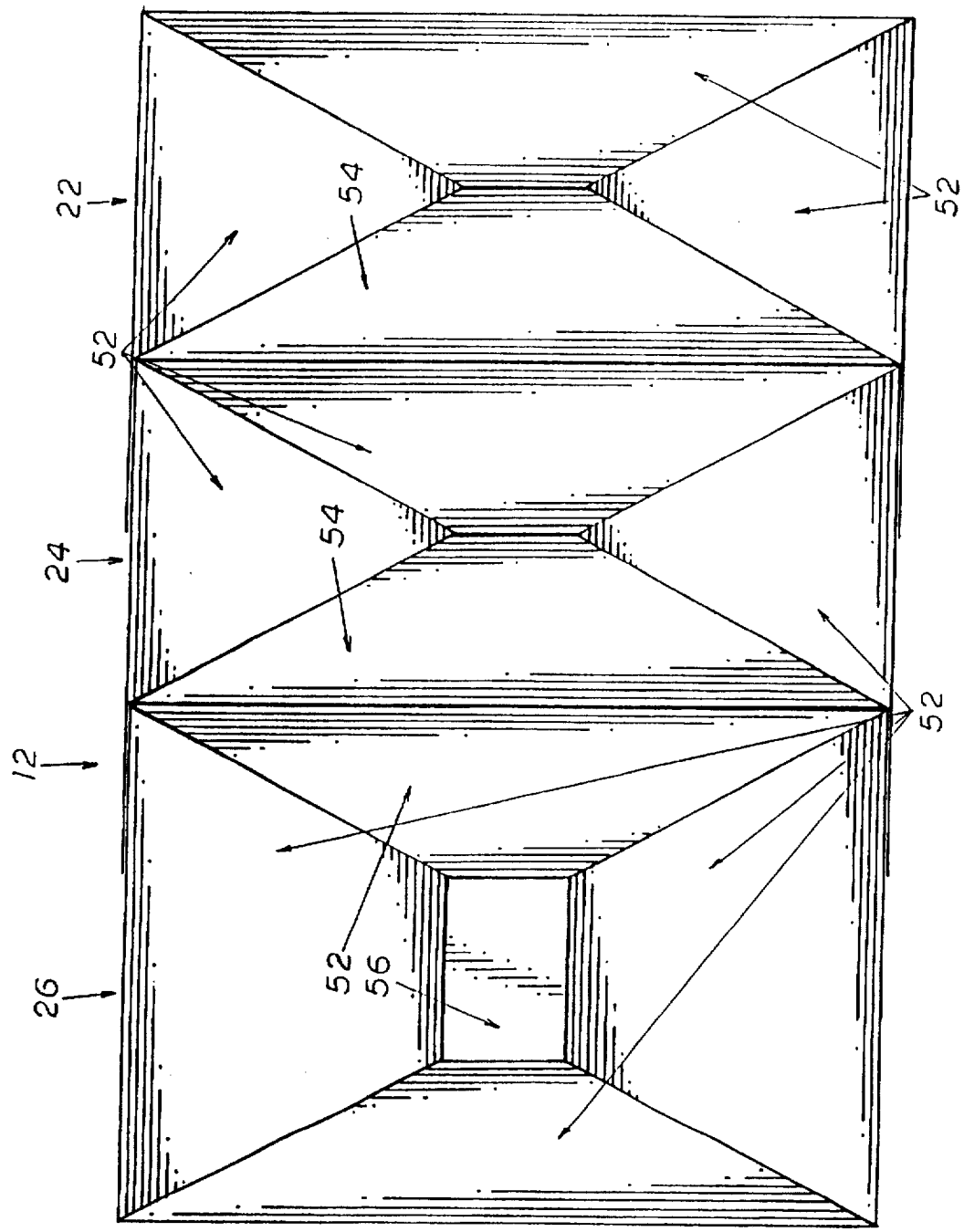
FIG. 6 is a top elevation view of the collapsible material bins and shows the orientation of said bins when they are in the collapsed, or transport position.
Figure 7:
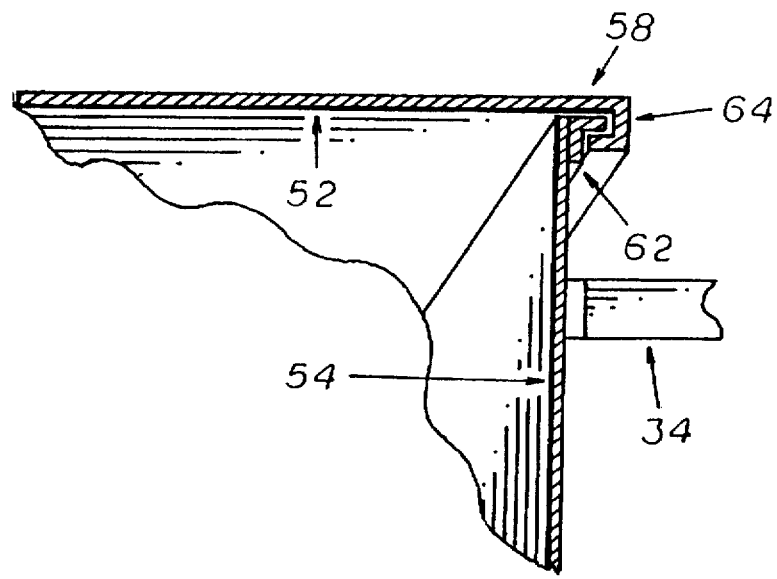
FIG. 7 is a top elevation sectional view of the walls of the collapsible material bins showing the manner in which a positive seal is obtained between the permanent and collapsible bin wall when the present invention is in its extended, or in use position.

An overhead view of the raw material bins 12 in their collapsed position is provided in FIG. 6. This figure more clearly depicts the manner in which the rear raw material bin 26 slides partially into the middle raw material bin 24 which in turn slides partially into the front raw material bin 22. Also shown is how the collapsible walls 54 of the front raw material bin 22 and the middle raw material bin 24 slide over and obscure the bin floors 56 of both the front and middle raw material bins, 22 and 24.

Figure 8:
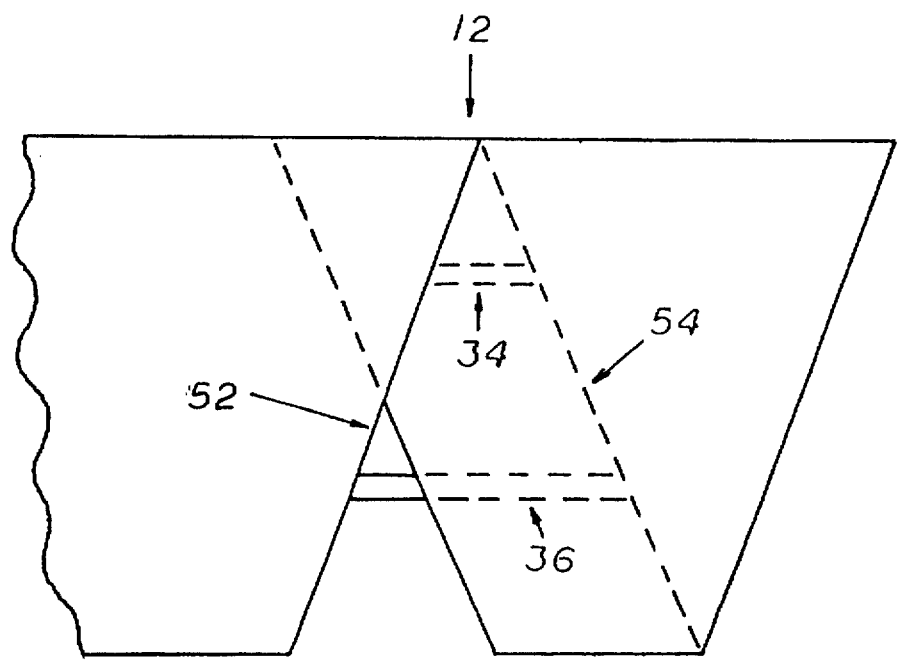
FIG. 8 is a side elevation view of the present invention with the inclusion of hidden lines to depict the manner in which the collapsible bin wall moves within the material bin.

The collapsible nature of the present invention is also illustrated by FIG. 8 where the position of the collapsible bin wall 54 in relation to the permanent bin walls 52 and to the upper and lower collapsible bin wall supports, 34 and 36, is shown from a side view when the raw material bins 12 are in their collapsed or transport position.

One of the problems in the design of the present invention was how to obtain a workable seal at the point where the collapsible walls 54 intersect the permanent walls 52 when the raw material bins 12 are in their extended position. This seal must provide a tight enough seal to keep fine raw materials such as sand from leaking through the joint and also be strong and durable enough to withstand the often harsh conditions that are common in a construction zone.

The present accomplishes this by providing a bin seal 58 at the intersection of the permanent bin walls 52 and the collapsible bin walls 54 just outside of the upper collapsible bin wall support 34. This seal is constructed by folding the edge of the permanent bin wall 52 inward upon itself thereby forming an inverted groove 64. The part of the bin seal 58 located on the collapsible bin wall 54 is formed by attaching a length of angle iron 62 along the entire outside edge of the collapsible bin wall 54. When the raw material bins 12 are in their extended position the leading edge of the angle iron 62 fits inside of the inverted groove 64. Thus, an effective, strong, and durable is formed at the desired location.

Although the present invention has been described in considerable detail with reference to certain preferred versions thereof, other versions are possible. For example different rail systems may be employed, multiple bins may be used with simple changes in size and different bin wall seals may be used. Therefore, the spirit and scope of the appended claims should not be limited to the description of the preferred versions contained herein.

What is claimed is:

1. A collapsible material bin system for use with a portable asphalt plant mounted on a flatbed trailer frame having a plurality of material bins, a conveyor system and an asphalt tumbler; the collapsible material bin system comprises:

a front material bin, one or more middle material bins, and a rear material bin;

each material bin having four walls and a upper and lower portion with said upper portion being substantially larger than said lower portion;

a means of collapsing one or more of said material bins for transport;

a means of supporting said material bins; and a system of rails whereby said middle bins may slide partially into said front bin and said rear bin may slide partially into the rear of the single or rear middle bin.

2. A collapsible material bin system as in claim 1 wherein said means of supporting said material bins comprises:

a support frame from said front and middle bins to said rails;

a rear bin support frame from said rear bin to a substantially stronger rear rail; and a support wheel system on said rear bin support frame.

3. A collapsible material bin system as in claim 2 wherein said system has three material bins.

4. A collapsible material bin system as in claim 2 wherein said system has four material bins.

5. A collapsible material bin system for use with a portable asphalt plant mounted on a flatbed trailer frame having a plurality of material bins, a conveyor system and an asphalt tumbler; the collapsible material bin system comprises:

a front material bin, a middle material bins, and a rear material bin;

each material bin having four walls and a upper and lower portion with said upper portion being substantially larger than said lower portion;

a system of rails whereby said middle bin may slide partially into said front bin and said rear bin may slide partially into said middle bin for transport;

a support frame from said front and middle bin to said rails;

a rear support frame from said rear bin to a substantially stronger rear rail;

a support wheel system on said rear bin support frame, the rear of the single or rear middle bin; and a means of sealing said material bins when said material bins are in use.

6. A collapsible material bin system as in claim 5 wherein said means of sealing said bins comprises:

a U shaped lip along a permanent wall of said material bins and an angle iron mounted along the edges of a moving wall of said material bin whereby said angle iron may intersect with said U shaped lip to form a seal when said material bins are in an extended position.

7. A collapsible material bin for use on a portable asphalt plant, said bin comprises:

a nonmovable back wall two nonmovable side walls and a front wall said bin further having a upper and lower portion with said upper portion being substantially larger than said lower portion whereby said bin tapers from said upper portion to said lower portion;

a system of rails whereby said front wall may slide partially into said bin allowing for the partial storage of another bin; and a means of sealing said front wall to said side walls when said bin is in use.

8. A collapsible material bin as in claim 7 wherein said means of sealing said front wall to said side walls comprises:

a U shaped lip along the two side walls were they adjoin said front wall; and an angle iron mounted along the edges of said front wall whereby said angle iron may intersect with said U shaped lip to form a seal when said material bins are in an extended position.

9. A portable asphalt plant with collapsible material bins comprising:

a flatbed trailer frame;

a drum type asphalt tumbler mounted on said trailer frame;

a front material bin, one or more middle material bins, and a rear material bin;

each material bin having four walls and a upper and lower portion with said upper portion being substantially larger than said lower portion;

a means of collapsing one or more of said material bins for transport;

a means of supporting said material bins; and a conveyor system connecting said material bins and said asphalt tumbler.

10. A portable asphalt plant with collapsible material bins as in claim 9 wherein said means of collapsing said material bins for transport comprises:

a system of rails whereby said bins may slide partially into one another.

11. A portable asphalt plant with collapsible material bins as in claim 10 wherein said means of supporting said material bins comprises:

a support frame from said front and middle bins to said rails;

a rear bin support frame from said rear bin to a substantially stronger rear rail; and a support wheel system on said rear bin support frame.

12. A portable asphalt plant with collapsible material bins as in claim 11 wherein said system has three material bins.

13. A portable asphalt plant with collapsible material bins as in claim 12 wherein said system has four material bins.

* * * * *